2,809,976

PRODUCTION OF ACRYLIC ACID OR ITS DERIVATIVES USING A CATIONIC COMPLEX NICKEL CATALYST

Walter Reppe, Ludwigshafen (Rhine), Herbert Friederich, Worms, Hans Lautenschlager, Ludwigshafen (Rhine), and Heinrich Laib, Heddesheim, Germany, assignors to Badische Anilin- & Soda-Fabrik Aktiengesellschaft, Ludwigshafen (Rhine), Germany No Drawing. Application July 14, 1955,
Serial No. 522,184

Claims priority, application Germany July 16, 1954

9 Claims. (Cl. 260—347.4)

This invention relates to an improved method of manufacturing acrylic acid and functional derivatives of acrylic acid. More particularly, the invention deals with the synthesis of acrylic acid and its functional derivatives by the interaction of acetylene, carbon monoxide and compounds with a reactive hydrogen atom in the presence of an improved complex nickel catalyst.

The manufacture of acrylic acid and its functional derivatives by the interaction of acetylene with carbon monoxide and a compound containing a reactive hydrogen atom, such as water, an alcohol, a phenol, a carboxylic acid or an amine in the presence of a nickel compound is well known by the work of W. Reppe. As a catalyst for this reaction there are also used complex nickel compounds which contain in addition to a halogen, phosphonium, arsonium or stibonium compounds. Other known catalysts are complex nickel compounds containing tertiary amines or ammonium compounds derived from tertiary amines.

It is an object of this invention to provide a method of manufacturing acrylic acid and its functional derivatives, particularly acrylic acid esters by the interaction of acetylene, carbon monoxide and a compound with a reactive hydrogen atom in the presence of an improved complex catalyst.

Another object is to provide a method of manufacturing an acrylic compound while a particular complex nickel compound is used as catalyst.

These and other objects, which will be apparent from the more detailed description of the invention, are accomplished by carrying out the reaction of acetylene, carbon monoxide and a compound with a reactive hydrogen atom in the presence of a complex compound of a nickel salt and a carboxylic acid amide.

Compounds with a reactive hydrogen atom are water, an alcohol, a carboxylic acid or an amine. Alcohols capable for the process are for instance methanol, ethanol, propanol, butanols and higher saturated alcohols having from 5 to 20 C-atoms in the molecule, preferably alcohols having 1 to 10 C-atoms in the molecule. Cyclic alcohols, such as phenols, cyclohexanols, benzyl alcohol and furfuryl alcohol may also be used.

Suitable complex compounds are derived preferably from nickel halongenides, advantageously from nickel bromide and nickel iodide and from amides of saturated aliphatic acids and cyclic carboxylic acids. Examples of such carboxylic acid amides are, for instance, formamide, acetamide and their higher homologues, as well as their N-monom- and N-dialkyl substituted derivatives, N-aryl and N-alkylaryl substituted carboxylic acid amides, for instance, acetanilide and N-alkyl acetanilides, amides of cyclic carboxylic acids such as cyclohexane carboxylic acid N-dimethyl amide and benzoic acid N-methyl amide. Other suitable amides are the lactams of aminocarboxylic acids and their N-alkyl derivatives such as pyrrolidone-2 and N-methyl pyrrolidone-2.

The complex compounds which are used as catalysts according to this invention are easily obtained by heating the nickel salt with a carboxylic acid amide, preferably to a temperature between 40° C. and 160° C. As a rule, for one molecule of the nickel salt from 4 to 10 molecules of the carboxylic acid amide are used. The complex compounds are usually solid substances strongly colored from green to blue and have a definite melting point. As a rule, they contain for one molecule of the nickel salt from 2 to 8 molecules of the carboxylic acid amide.

A method of making complex heavy metal salts of N-substituted carboxylic acid amides which are preferably used according to this invention is set forth in more detail in the copending application Serial No. 522,183, filed on July 14, 1955, by Walter Reppe, Herbert Friederich and Hans Lautenschlager for Complex Heavy Metal Salts. For the synthesis of the acrylic compounds, solutions of the complex compounds in the liquid initial materials can be used. It is, however, also possible to add during the synthesis of the acrylic compound solvents such as hydrocarbons, ether or carboxylic acid amides. Instead of using the separately manufactured complex compounds as catalysts, it is possible to make these compounds in situ by introducing the initial compounds, i. e., a nickel salt and a carboxylic acid amide, in the reaction vessel for the synthesis of the acrylic compounds. Thus, the complex catalyst is formed when the reaction mixture is heated. The initial materials for the complex catalyst are so selected that they correspond best to the particular raw materials used for the synthesis of the acrylic compound and to the reaction conditions, e. g. if a high-boiling derivative of acrylic acid may be obtained, preferably a carboxylic acid amide is used, which has a higher boiling point than the said derivative. In the usual case the concentration of nickel in the reaction mixture is between 0.1 and 1% by weight, preferably between 0.3 and 0.5%. If the complex catalysts are formed in situ, it is not necessary to use the initial materials in stoichiometrical proportions. The molar relation of nickel to amide may be between 1 to 2 and 1 to 10, preferably between 1 to 3 and 1 to 6. There may also be used complex salts which derive from mixtures of carboxylic acid amides and/or from mixtures of different nickel salts such as mixtures of nickel bromide and nickel iodide.

The reaction conditions for the synthesis of the acrylic compounds in the presence of the complex nickel compounds according to this invention are the same as they are usually employed for this synthesis according to Reppe. The reaction may be carried out at temperatures of 100 to 250° C. under pressure of about 10 to 70 atm. discontinuously in an autoclave or continuously in reaction towers using a trickling, a continuous current or countercurrent technique. Further details concerning the reaction conditions are to be obtained from Justus Liebigs Annalen der Chemie, vol. 582 (1953), pp. 1 to 37.

It is advantageous that the complex catalyst of this invention forms neutral solutions whereby the formation of basic salts of the catalyst metal and the formation of ethers is extensively avoided. Another advantage consists in the fact that the carboxylic acid amide can easily be separated by distillation from the residue obtained after distilling off the formed acrylic compound and the solvent. The originally used nickel salt is obtained thereby in an easily separable form and can be used again. It is also possible to separate the complex nickel compound itself from the distillation residue and to use it again as catalyst.

The invention is further illustrated by the following examples. The parts are by weight unless otherwise indicated.

Example I 20 parts of nickel-II-bromide are dissolved in 40 parts of N-methyl pyrrolidone-2 while stirring and slowly heating the mixture to a temperature of 150° C. After the nickel bromide has completely dissolved, the solution is cooled and 20 parts of a crystalline dark blue complex compound separate. The crystal sludge is separated from the mother liquor and the latter is covered with a layer of 80 parts of diethyl ether. Within 24 hours 18 additional parts of the same complex compound separate. After recrystallization from tetrahydrofurane the complex compound has a melting point of 105° C. It contains for one molecule of nickel bromide three molecules of N-methyl pyrrolidone-2.

In an autoclave there are introduced 3 parts of the complex compound $NiBr_2.3N$-methyl pyrrolidone-2 and 80 parts of n-butanol. The air content of the autoclave is removed by pressing in nitrogen several times and by releasing the pressure cautiously. The autoclave is then heated to 185° C., and a mixture of equal parts by volume of acetylene and carbon monoxide under a pressure of 28 atmospheres is pressed in. The consumed gas mixture is repressurized each hour. After 12 hours, the autoclave is cooled and the pressure is released. The weight of the liquid autoclave content is increased by 26 parts. The reaction mixture is distilled, yielding 99 parts of a 58 percent solution of acrylic acid butyl ester in butanol and 10 parts of a liquid residue. The residue may be distilled under vacuum, yielding N-methyl pyrrolidone-2 as distillate and nickel bromide which may be used again as a residue.

Example II

Through a vertically arranged high pressure tube of stainless steel having a volume of 3 liters are continuously pumped from the bottom to the top 500 cubic centimeters per hour of a mixture consisting of 1.2 parts of nickel bromide, 2.8 parts of N-methyl pyrrolidone-2 and 97 parts of ethanol. This mixture is kept at a temperature of 185° C. Simultaneously there are introduced in countercurrent 0.15 normal cubic meter of a gas mixture under a pressure of 45 atmospheres consisting of equal parts by volume of acetylene and carbon monoxide. 100 parts of the resulting reacting liquid mixture yield 90 parts of 59 percent acrylic acid ethyl ester solution in ethanol and 10 parts of a residue from which the nickel salt may be recovered as in Example I.

Example III 30 parts of ethanol, 550 parts of tetrahydrofurane and 3 parts of the complex compound $NiBr_2.3N$-methyl pyrrolidone-2 (melting point 105° C.) are reacted at a pressure of 45 atmospheres with acetylene and carbon monoxide as in Example I. After 12 hours the weight of the liquid reaction mixture is increased by 23 parts. The reaction mixture is distilled, and 100 parts of a 44 percent acrylic acid ethyl ester in tetrahydrofurane and ethanol and 6 parts of a residue are obtained.

Example IV 0.6 part of nickel bromide is dissolved in a mixture of 70 parts of N-methyl pyrrolidone-2 and 10 parts of water. This mixture is reacted as described in Example I with acetylene and carbon monoxide at a pressure of 45 atmospheres. The weight increase is 25 parts. By distillation, 91 parts of a 27 percent acrylic acid solution in N-methyl pyrrolidone-2 are obtained.

If a solution of 3 parts of the complex compound $NiBr_2.3N$-methyl pyrrolidone-2 (melting point 105° C.) in 75 parts of tetrahydrofurane and 10 parts of water is reacted with acetylene and carbon monoxide in an analogous manner, the weight increase is 14 parts. By distillation of this reaction mixture, 98 parts of a 14 percent acrylic acid solution in tetrahydrofurane and 4 parts of a residue are obtained.

Example V 75 parts of n-butanol and 1.25 parts of nickel bromide dissolved in 5 parts of pyrrolidone-2 are reacted at a pressure of 28 atmospheres with acetylene and carbon monoxide as described in Example I. The weight increase is 19 parts. By distillation, 86 parts of a 40 percent acrylic acid butyl ester solution in butanol and 13 parts of a residue are obtained.

Example VI

A mixture of 22 parts of ethanol, 60 parts of tetrahydrofurane and 1.2 parts of nickel bromide dissolved in 3 parts of N,N-dimethylformamide are reacted for 12 hours at a pressure of 45 atmospheres and a temperature of 185° C. with a mixture of equal parts by volume of acetylene and carbon monoxide. The weight of the liquid reaction mixture increases thereby by 25 parts. By distillation, 103 parts of a 41 percent acrylic acid ethyl ester solution in ethanol and tetrahydrofurane and 8 parts of a residue are obtained.

Example VII 35 parts of ethanol, 50 parts of tetrahydrofurane and 1.5 parts of nickel bromide dissolved in 3 parts of N,N-dimethyl acetamide are reacted with acetylene and carbon monoxide at a pressure of 45 atmospheres. The increase in weight is 26 parts. By distillation, 104 parts of a 43 percent acrylic acid ethyl ester solution in ethanol and tetrahydrofurane, and 10 parts of a residue are obtained.

If 35 parts of ethanol, 50 parts of tetrahydrofurane and 1.2 parts of nickel bromide dissolved in 45 parts of molten N-methyl acetanilide are reacted with acetylene and carbon monoxide under the same conditions, the weight increase is 26 parts, and 105 parts of a 40 percent acrylic acid ethyl ester solution and 9 parts of a residue are obtained.

Example VIII 1.2 parts of nickel bromide dissolved in 2.5 parts of molten acetamide and 80 parts of n-butanol are reacted with acetylene and carbon monoxide as described in Example I. The weight increase is 20 parts. By distillation, 93 parts of a 40 percent acrylic acid butyl ester in butanol and 10 parts of a residue are obtained.

If, under the same reaction conditions, as catalyst 8 parts of nickel bromide dissolved in 4.5 parts of molten N,N-dimethyl benzamide are used, a weight increase of 15 parts is obtained, and by distillation, 93 parts of a 35 percent acrylic acid butyl ester solution in butanol and 7 parts of a residue are obtained.

Example IX

In a revolving autoclave of stainless steel holding 0.8 liter a mixture of 15 parts of $NiBr_2.3N$-methyl pyrrolidone-2; 100 parts of phenol and 200 parts of tetrahydrofurane are reacted with acetylene and carbon monoxide in the manner described in Example I but under a pressure of 45 atmospheres. The weight increase is 105 grams after 20 hours. By distillation, 379 parts of a 40 percent solution of acrylic acid phenylate in tetrahydrofurane and phenol and 41 parts of a residue are obtained.

Example X

Through a vertically arranged high pressure tube of stainless steel of 5 liters capacity 0.7 liter of a mixture of 3 parts of $NiBr_2.3N$-methyl pyrrolidone-2 and 97 parts of 2-ethylhexanol are continuously pumped per hour from the bottom to the top at 190° C., 0.25 cubic meter (N. T. P.) of a mixture of equal parts of acetylene and carbon monoxide being simultaneously passed through the tube in countercurrent at a pressure of 28 atmospheres. 0.9 liter of the reaction product are hourly obtained. From 100 parts of the reaction product there are obtained, by distillation, 86 parts of a 51 percent solution of acrylic acid ethyl hexyl ester in ethyl hexanol and 14 parts of a residue.

*Example XI*

A mixture of 80 parts of methanol and 2.4 parts of $NiBr_2$ dissolved in 4 parts of dimethyl formamide is caused to react with a gas mixture of equal parts of acetylene and carbon monoxide at 195° C., under a pressure of 45 atmospheres, in the manner described in Example I. The weight increase is 16 grams after 12 hours. By distillation, 84 parts of a 42 percent solution of acrylic acid methyl ester in methanol and 12 grams of a residue are obtained.

*Example XII*

A mixture of 15 parts of $NiBr_2$-3N-methyl pyrrolidone-2; 140 parts of benzyl alcohol and 200 parts of tetrahydrofurane is reacted in the manner indicated in Example IX. The weight increase is 57 parts in 24 hours. By distillation, 350 parts of a 32 percent solution of acrylic acid benzyl ester in tetrahydrofurane and benzyl alcohol and 55 parts of a residue are obtained.

*Example XIII*

85 parts of cyclohexanol and 3 parts of $NiBr_2$.3N-methyl pyrrolidone-2 are reacted with a gas mixture of equal parts of acetylene and carbon monoxide in the manner indicated in Example I. The weight increase is 19 parts after 12 hours. From 107 parts of the reaction product, by distillation, 90 parts of a 46 percent solution of acrylic acid cyclohexyl ester in cyclohexanol and 11 parts of a residue are obtained.

The invention is hereby claimed as follows:

1. In a method of manufacturing acrylic acid and its functional derivatives by the reaction of acetylene with carbon monoxide and a compound with a reactive hydrogen atom in the presence of a nickel compound as a catalyst, the improvement which comprises carrying out said reaction while using as catalyst a complex compound of a nickel compound selected from the class consisting of nickel bromide and nickel iodide and of a carboxylic acid amide of the formula

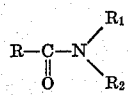

wherein R is a radical selected from the class consisting of hydrogen, alkyl, cycloalkyl and aryl; $R_1$ is a radical selected from the class consisting of hydrogen, alkyl, aryl, and, jointly with R, a bivalent polymethylene group, and $R_2$ is a radical selected from the class consisting of hydrogen, alkyl, and aryl.

2. In a method of manufacturing an arcylic acid ester by the reaction of acetylene with carbon monoxide and an alcohol in the presence of a nickel compound as a catalyst, the improvement which comprises carrying out said reaction while using a complex compound of a nickel compound selected from the class consisting of nickel bromide and nickel iodide and of a carboxylic acid amide of the formula

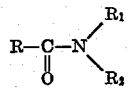

wherein R is a radical selected from the class consisting of hydrogen, alkyl, cycloalkyl and aryl; $R_1$ is a radical selected from the class consisting of hydrogen, alkyl, aryl, and, jointly with R, a bivalent polymethylene group, and $R_2$ is a radical selected from the class consisting of hydrogen, alkyl, and aryl.

3. A method as claimed in claim 2 wherein said catalyst is a $NiBr_2$.3N-methyl pyrrolidone-2.

4. In a method of manufacturing acrylic acid and its functional derivatives by the reaction of acetylene with carbon monoxide and a compound with a reactive hydrogen atom in the presence of a nickel compound as a catalyst, the improvement which comprises carrying out said reaction in the presence of a nickel salt selected from the class consisting of nickel bromide and nickel iodide and a carboxylic acid amide of the formula

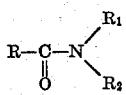

wherein R is a radical selected from the class consisting of hydrogen, alkyl, cycloalkyl and aryl; $R_1$ is a radical selected from the class consisting of hydrogen, alkyl, aryl, and, jointly with R, a bivalent polymethylene group, and $R_2$ is a radical selected from the class consisting of hydrogen, alkyl, and aryl, said salt and said amide being capable of forming a complex compound under the reaction conditions.

5. A method as claimed in claim 4 wherein said reaction is carried out in the presence of nickel bromide and N-methyl-pyrrolidone-2.

6. A method as claimed in claim 4 wherein said reaction is carried out in the presence of nickel bromide and pyrrolidone-2.

7. A method as claimed in claim 4 wherein said reaction is carried out in the presence of nickel bromide and N-dimethyl formamide.

8. In a method of manufacturing acrylic acid by the reaction of acetylene with carbon monoxide and water in the presence of a nickel compound as a catalyst, the improvement which comprises carrying out said reaction in the presence of nickel compound selected from the class consisting of nickel bromide and nickel iodide and of a carboxylic acid amide of the formula

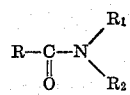

wherein R is a radical selected from the class consisting of hydrogen, alkyl, cycloalkyl and aryl; $R_1$ is a radical selected from the class consisting of hydrogen, alkyl, aryl, and, jointly with R, a bivalent polymethylene group, and $R_2$ is a radical selected from the class consisting of hydrogen, alkyl, and aryl.

9. A process as claimed in claim 8 wherein said reaction is carried out in the presence of nickel bromide and N-methyl-pyrrolidone-2.

References Cited in the file of this patent

UNITED STATES PATENTS 2,738,364    Reppe et al. _____ Mar. 13, 1956

OTHER REFERENCES

Copenhaver et al.: "Acetylene and Carbon Monoxide Chemistry" (Reinhold Publishing Co., New York City, 1949), pages 257–265, 296.